(12) United States Patent
Savory

(10) Patent No.: US 6,839,129 B1
(45) Date of Patent: Jan. 4, 2005

(54) PMD MEASUREMENT AND COMPENSATION

(75) Inventor: Sebastian John Savory, Churchill College (GB)

(73) Assignee: Nortel Networks Limited, St. Laurent (CA)

( * ) Notice: Subject to any disclaimer, the term of this patent is extended or adjusted under 35 U.S.C. 154(b) by 244 days.

(21) Appl. No.: 10/005,296

(22) Filed: Dec. 5, 2001

(51) Int. Cl.⁷ .............................................. G01N 21/00
(52) U.S. Cl. ................................................... 356/73.1
(58) Field of Search .......................... 356/73.1; 385/11, 385/15, 24, 27, 122; 359/156, 158, 161, 192, 122, 154

(56) References Cited

U.S. PATENT DOCUMENTS 6,330,375 B1 * 12/2001 Fishman et al. ............... 385/11

FOREIGN PATENT DOCUMENTS

EP 1 109 338 A2 6/2001

OTHER PUBLICATIONS

Takahashi T et al: "Automatic Compensation Technique for Timewise Fluctuating Polarisation Mode Dispersion in In–Line Amplifier Systems", Electronics Letters, Feb. 17, 1994, vol. 30, No. 4, pp. 348–349.

Ishikawa G et al: "Polarization–Mode Dispersion Sensitivity and Monitoring in 40–Gbit/s OTDM and 10–Gbit/s NRZ Transmission Experiment", OFC '98 Technical Digest, 1998, pp. 117–118.

Kikuchi N: "Analysis of Signal Decree of Polarization Degradation Used as Control Signal for Optical Polarization Mode Dispersion Compensation" Journal of Lightwave Technology, IEEE, New York, US, vol. 19, No. 4, Apr. 2001.

* cited by examiner

Primary Examiner—Tu T. Nguyen
(74) Attorney, Agent, or Firm—Barnes & Thornburg LLP

(57) ABSTRACT

A polarization mode dispersion (PMD) compensator for compensation of PMD in polarization bit interleaved (PBI) optical signals is disclosed. The control uses spectral analysis of components of the electrical output, particularly analysis of a spectral component having a frequency corresponding to the bit frequency of the two bit streams which form the bit interleaved signal. Minimising this spectral component results in alignment of the signal in the system at 45 degrees to the two principal axes. An apparatus for measuring PMD based on spectral analysis is also disclosed.

15 Claims, 1 Drawing Sheet

PMD MEASUREMENT AND COMPENSATION

FIELD OF THE INVENTION

This invention relates to apparatus and methods for measuring and compensating PMD in optical systems using the polarization bit interleaved (PBI) data structure.

BACKGROUND TO THE INVENTION

Fibre-optic transmission systems are now being developed for tens of gigabits-per-second (Gbit/s) communication channels, whilst large volumes of 10 Gbit/s systems are being fully deployed into existing networks. Various potential limits are approached as the performance of such transmission systems is pushed further. The phenomenon of polarisation mode dispersion, PMD, is a problem recently attracting a great deal of attention from the telecommunications industry. PMD is a type of distortion that varies from fibre to fibre and is typically of greater magnitude in older fibres. PMD is also a random phenomenon, varying with both time and optical frequency. While service providers are reluctant to invest in new fibre routes, PMD may restrict the deployment of new systems over the older fibre routes of their network. In a small number of fibres, PMD will give rise to distortions so large that a 10 Gbit/s optical transmission system cannot be reliably deployed over the route. The impact of PMD scales linearly with system bit-rate, hence PMD will become a greater problem as the bit-rate of systems are increased. It is for these reasons that PMD solutions have to be found.

PMD is a fundamental characteristic of both optical fibres and optical components. It arises from the consideration that single mode fibre can actually support two weakly guided modes that are orthogonally polarised. In other words, given an ideal fibre, a pulse can be launched into either of these two polarisation modes and propagate through the fibre in that polarisation mode alone. A fiber exhibits slightly different refractive indices along different axes, a physical characteristic known as birefringence. Birefringence arises from a variety of intrinsic and extrinsic features of the fibre manufacture. These features include geometric stress caused by a noncircular core, and stress birefringence caused by unsymmetrical stress of the core. Other sources of birefringence include external manipulation of the fibre. External forces will include squeezing the fibre, bending the fibre and twisting of the fibre.

In a birefringent fibre, the propagation speed will vary with the launch polarisation state into the polarisation modes of the fibre. Consequently, when proportions of the pulse are launched into both polarisation axes they travel at different speeds and hence arrive at different times. The magnitude of the difference in arrival times between the fastest and slowest paths (along the two Principle States of Polarization (PSPs)) through the fibre is known as the differential group delay (DGD).

The receiver of a direct detection optical transmission system does not distinguish between the different polarisation modes, but simply detects the combination of the different polarisation modes. The difference in arrival times of the pulse through the two polarisation modes will degrade the quality of the received data.

In a long length of fibre the birefringence in expected to be weak but vary randomly along its entire length. This leads to random mode coupling along the fibre, a process by which the pulse will continuously couple power between the two polarisation modes of the fibre. The phenomenon of PMD relates to the random variation of the DGD of the fibre. The DGD is expected to vary randomly over time due to random variations of the fibre birefringence as a result of environmental effects, such as temperature. A consequence of this random variation means that the instantaneous DGD of a fibre cannot be predicted. Instead the DGD of a fibre must be described statistically. The fibre DGD also varies over frequency/wavelength.

The DGD is the first-order consideration of PMD. It makes the assumption that the PMD characteristics of a fibre are constant over the bandwidth of the transmitted data signal. Higher-orders of PMD are considered when the PMD characteristics can no longer be considered constant over the bandwidth of a signal. Higher-order PMD relates to the variation of the PMD characteristics of a fibre with frequency.

In order to compensate for first order PMD, it has been proposed to use a delay line which provides differential delay for different polarisation states, in order to reverse the system fiber DGD. A particular class of fibres, known as high birefringence (Hi-Bi) fibres, has been engineered deliberately to have very high, uniform birefringence for this purpose. The fibres have two clearly definable axes with different refractive indices. The propagation speed of a pulse will differ greatly between each axis.

Three categories of techniques are used for PMD compensations. They are all-optical, all electrical, and hybrid.

For all-optical PMD compensation, the restoration of PMD distortion is done optically without any optical-electrical conversion. The signal remains in the optical domain. Normally, all-optical PMD compensators consist of a polarization controller and a fixed birefringent delay element, such as a piece of high birefringence optical fiber. The basic concept is to align the principal states of polarization (PSP) of the fiber with the principal axes of the birefringent delay element to reverse the DGD of the system fiber.

In the all-electrical method, the distorted optical signal is converted to an electrical signal at the receiver. A delay line filter with specific weights is used to partially compensate for the distortion due to PMD.

Hybrid PMD compensation is a technique that uses both optical and electrical methods to restore the distortion due to PMD. For example a polarization controller (PC) and a polarization beam splitter (PBS) can be used to transform the states of polarization, and split the polarization components. At each output of the PBS, a high-speed photo-detector converts the optical signal to electrical signal. An electrical delay line is used to adjust the phase delay between the two electrical signals.

Problems with the known compensation techniques arise from the need to determine principal states of polarization of the system, and also the need to evaluate the PMD to be corrected.

In polarization bit interleaved (PBI) optical communications systems, adjacent pulses in a transmitted signal have orthogonal polarization. PMD then has the most significant effect when these orthogonal polarizations correspond to the PSPs of the transmission fiber. For bit interleaved signals, the all-optical PMD compensator described above has limited efficacy. PMD compensation is also therefore more difficult for PBI systems.

There are also difficulties in measuring the PMD in a system. Methods for measuring PMD can be broadly categorized in two groups: methods that make measurements in the time domain, and methods that make measurements in the frequency (or wavelength) domain.

The modulation-phase-shift method injects high-frequency sinusoidal intensity modulation into the fiber, and then measures the phase delay of the light exiting the fiber. In performing this test the equipment changes the input state of polarization (during the intensity modulation) to find the maximum and minimum delay. At the maximum and minimum delay the input state of polarization is aligned with the fiber's principal axes. The phase difference between the maximum and minimum delay is then used to determine the amount of PMD at that wavelength. To find the PMD at another wavelength the source can be tuned to another frequency and the test repeated. This method thus measures the instantaneous PMD at a particular wavelength. This method is conceptually quite simple, but it does require the experimental determination of the principal axes. In other words, the measurement must be carried out many times with different input states of polarization in order to determine which states of polarization correspond to the principal axes in the fiber.

The modulation-phase-shift method uses high-speed intensity modulation and phase measurements to directly measure the difference in propagation time for the two principal axes of the device under test.

The pulse-delay method is a direct measurement of the difference in propagation time between pulses launched into the two principal axes. Implementing this method involves launching very short pulses of light into the fiber's two principal axes of polarization and then measuring directly the pulse delay between them. This method, like the modulation phase shift method, also requires experimentally finding the principal axes of polarization.

The above techniques are all time-domain measurements. Frequency-domain measurements use either a source with a broad spectrum (like an LED) or a tunable laser. They make measurements over a wide range of wavelengths. Mathematically, measuring PMD over a wide range of wavelengths gives the same average value of PMD as measuring it at a single wavelength, but over a long period of time. Thus, frequency-domain measurements tend to provide the average PMD value.

Thus, in the past, the measurement of PMD in the system has required complicated analytical processes, particularly requiring test signals to be injected into the component. Furthermore, conventional PMD measurement techniques require the orientation of the system PSPs to be experimentally determined.

SUMMARY OF THE INVENTION

According to a first aspect of the invention, there is provided a polarization mode dispersion (PMD) compensator for compensation of PMD in polarization bit interleaved (PBI) optical signals comprising two interleaved bit streams, the compensator comprising:

a polarization controller;

a birefringent element;

a converter for converting an optical output to an electrical signal; and an analyser for, analysing at least one selected spectral component of the electrical signal, wherein the orientation of a signal entering the birefringent element is controlled by the polarization controller in dependence on the electrical signal power of the at least one spectral component, having a frequency corresponding to the bit frequency of the two bit streams which form the bit interleaved signal.

The invention is based on the recognition that analysis of the electrical power spectrum at the output of a compensator can be used to provide control of the compensator for systems using PBI signals. In particular, minimising a spectral component having a frequency corresponding to the bit frequency of the two bit streams which form the bit interleaved signal results in alignment of the signal in the system at 45 degrees to the two principal axes of the system (the "system" comprising the components in which PMD arises as well as the compensation element). Thus, a control scheme which minimises this spectral component will provide the desired polarization alignment for a PBI system.

The compensator may comprise a filter for extracting the at least one selected spectral component of the electrical signal.

The control scheme may rely upon at least first and second spectral components, the first having a frequency corresponding to the bit frequency of the two bit streams which form the bit interleaved signal and the second having a frequency not equal to an integer multiple of the bit frequency of the two bit streams. As discussed above, the power of the first spectral component should be minimized, but in addition, it can be shown that maximizing the power at frequencies not equal to an integer multiple of the bit frequency of the two bit streams results in minimized overall PMD.

To take these two factors into account, it is possible to maximize the ratio of the powers of the second and first spectral components, or to maximize the difference between the second and first spectral components. In either case, the second spectral component may have a frequency of approximately half the bit frequency of the two bit streams which form the bit interleaved signal.

The invention also provides a method of providing PMD compensation for compensation of PMD in PBI optical signals comprising two interleaved bit streams, the method comprising:

passing the signal through a birefringent element, and controlling the polarization at the input to the birefringent element;

converting the optical output from the birefringent element to an electrical signal;

measuring the electrical signal power at a first frequency corresponding to the bit frequency of each of the two bit streams which form the bit interleaved signal; and using the measured electrical signal power as a control parameter for controlling the polarization at the input to the birefringent element.

This method provides the compensation control based on the electrical signal power spectrum, particularly at the bit frequency of the two bit streams. Again, the electrical signal power at a second frequency not equal to an integer multiple of the bit frequency of the two bit streams which form the bit interleaved signal may also be measured.

According to a second aspect of the invention, there is provided an apparatus for estimating PMD in an optical component through which a PBI optical signal has propagated, the apparatus comprising:

a converter for converting an optical output from the component to an electrical signal; and an analyser for analysing at least selected spectral components of the electrical signal, the PMD in the optical component being derived from the electrical signal power at a frequency corresponding to the bit frequency of the bit interleaved signal and from the de signal power.

This aspect of the invention is based on recognition that analysis of the electrical power spectrum at the output of system can be used to provide an estimate of the PMD in the system, for PBI systems. In particular, the PMD can be derived from the do power and the bit frequency of the PBI signal.

The bit frequency of the bit interleaved signal may be 40 GHz, formed from two bit streams of 20 Gbits/s.

The analyser may comprise a filter arrangement for extracting the spectral components of the electrical signal.

The second aspect of the invention also provides a method for estimating PMD in an optical component through which a PBI optical signal has propagated, the method comprising:
converting the optical output to an electrical signal;
measuring the electrical dc signal power and the electrical signal power at a frequency corresponding to the bit frequency of the bit interleaved signal; and
deriving the level of PMD from the two electrical signal powers.

The level of PMD may in particular be derived from the ratio of the two electrical signal powers.

BRIEF DESCRIPTION OF THE DRAWINGS

Examples of the invention will now be described in detail with reference to the accompanying drawings, in which.

DETAILED DESCRIPTION

Figure 1:
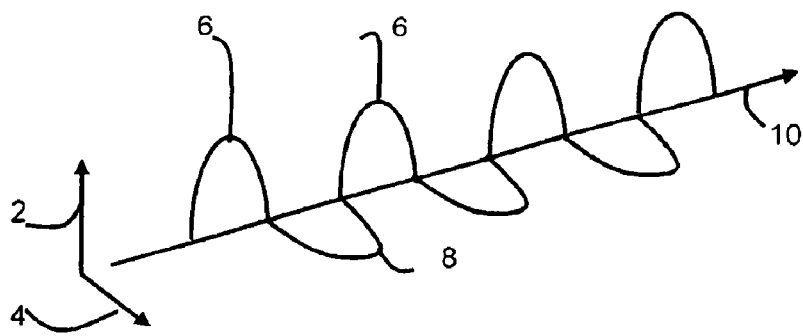
FIG. 1 is used to explain the nature of polarization bit interleaved (PBI) signals.

FIG. 1 shows a polarization bit interleaved (PBI) signal. Arrows 2,4 indicate orthogonal axes, and the signal is made up from two bit streams 6,8 having linear polarization aligned with the axes 2,4. Axes 10 represents time. Each bit stream has the same bit frequency, and the two streams are staggered with respect to each other.

To generate the PBI signal, a single return to zero pulse train is generated and is provided on two paths. Each path is provided with a modulator so that the two bit streams are generated. One pulse train is delayed with respect to the other, and the polarizations are controlled before combining the pulse trains to form the PBI signal. The PBI signal has double the bit rate of the individual bit streams. The separation of the two pulse streams using polarization reduces interference between sequential pulses in the combined PBI signal resulting from dispersion.

Figure 2:
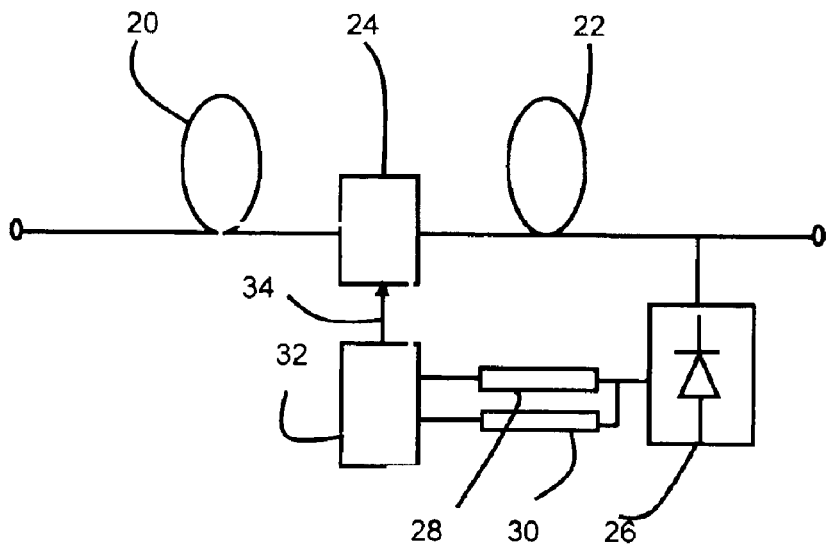
FIG. 2 shows one example of a PMD compensator according to the invention.

FIG. 2 shows one example of a PMD compensator according to the invention. The PMD compensator is for compensating for PMD in any component, for example a length of system fiber 20 as shown, which may comprise the span between nodes in a communications system. A length of high birefringence fiber 22 is provided, and a polarization controller 24 controls the launch angle into the fiber 22. Varying the launch angle influences the effect of the fiber 22, either to cancel the system PMD or to compound the PMD. The polarization controller can be considered to alter the orientation of the overall system PSPs, and thereby alter the orientation of the PSPs with respect to a signal in the system.

Before describing the further components of the invention, the theory underlying the invention will first be described.

The invention is based on the recognition that spectral analysis of the output of a system using PBI signals can be used to provide information concerning the PMD in the system, and can also be used to provide control of a compensator, particularly to provide signal orientation midway between the PSPs of the system.

The invention follows from an analysis of the electrical output power spectrum from a system in which PBI signals propagate. It can be shown that the electrical power spectrum is given by:

$$S(\omega) = \frac{1 - 4(1-\gamma)\gamma\sin^2(\omega\Delta\tau/2)}{2T} \quad (1)$$

$$+ \frac{1}{2T}\frac{2\pi}{T}\sum_{L=ODD}(2\gamma-1)^2\left\{1 - \cos\left(\frac{2\pi L}{T}\Delta\tau\right)\right\}\delta\left(\omega - \left(\frac{2\pi L}{T}\right)\right) \quad (2)$$

$$+ \frac{1}{2T}\frac{2\pi}{T}\sum_{L=EVEN}\left\{1 - \cos\left(\frac{2\pi L}{T}\Delta\tau\right)\right\}\delta\left(\omega - \frac{2\pi L}{T}\right) \quad (3)$$

In this equation:
T is the bit rate per channel (so for 2×20 GHz channels interleaved to form the PBI signal, T=50 ps)
$\Delta\tau$ is the PMD for the system (which will include the PMD compensator when provided)
$\gamma$ is the proportion of power launched into the principal states (i.e. $\gamma=1$ and $\gamma=0$ correspond to launch in the two principal states, and $\gamma=0.5$ corresponds to a 45° launch state)
$\delta$ is the delta function, and
$\omega$ is the angular frequency.

Term (1) of this equation is a broadband power term. This term has a maximum value when $\gamma=1$ or else when the $\sin^2$ term is zero, namely when $\Delta\tau.\omega$ is zero. Minimising the PMD for a particular frequency will have the effect of minimising the $\Delta\tau.\omega$ term, and term (1) will as a result be maximised.

Thus, one control scheme for minimising the PMD is to seek to maximise Term (1) for a chosen frequency. This chosen frequency can be any frequency (other than frequencies which are a multiple of the channel frequencies as will be seen below).

Term (1) in fact defines a notch profile (providing the launch state is not into the PSPs), with the notch at the frequency where $\Delta\tau.\omega=\pi$ (so that $\Delta\tau=1/(2f)$). For example, for a frequency of 10 GHz, a notch is present if the system PMD is 50 ps. When selecting a frequency to use as the control parameter for PMD compensation, a frequency should be selected which avoids this notch.

In practice, the total PMD in the system is likely to be a maximum of around 25 ps when compensating for a length of transmission fiber (15 ps from the system fiber and 10 ps from the high birefringence compensator). Thus, a frequency of 20 GHz or below should be selected as the test frequency used for minimising the total PMD $\Delta\tau$. Essentially, the control then involves tuning a launch angle until Term (1) is maximised for the selected frequency, which will taken as 10 GHz by way of example.

Term (2) defines a series of delta functions at odd multiples of the basic PBI frequencies. For example, if the PBI signal is 2×20 GHz bit streams, Term (2) defines delta functions at 20 GHz (L=1), 60 GHz (L=3) etc. In practice, the bandwidth of the receiver is not significantly greater than the combined bit rate (40 GHz in this case) so that the only term of interest is L=1, namely 20 GHz in this case.

This term is zero when $(2\gamma-1)=0$. In other words, this term is zero when the $\gamma=\frac{1}{2}$, namely when the launch state is at 45 degrees to the two PSPs of the total system. As mentioned above, this minimises the penalty for a given level of PMD in a PBI system. Thus, an optimal PMD compensation strategy will include minimisation of this frequency component.

Term (3) defines a series of delta functions at even multiples of the basic PBI frequencies. This term is independent of the launch state. Again, if the PEI signal is 2×20 GHz bit streams, Term (3) defines delta functions at DC (0 Hz) (L=0), 40 GHz (L=2) etc. The only terms of interest are L=0 and L=2 namely 0 Hz and 40 GHz in this case. The delta function at 0 Hz is dominant over the broadband term (1), so that measurement of the DC power level effectively provides an estimation of Term (3) for L=0.

The ratio of Term (3) between the L=2 value (40 GHz) and the L=0 value (0 Hz) has only a variable term in $\Delta\tau$ (all other values are known constants). Thus, comparing the 40 GHz and DC components can provide an evaluation of the level of PMD.

As described above, minimising Term (2) brings the launch state towards 45 degrees, which is desired for PBI systems. In itself, this does not necessarily minimise system PMD but merely the penalty for a given level of PMD. In particular, minimizing Term (2) (the 20 GHz tone) either minimises the DGD or else results in launch at 45 degrees to the PSPs. As discussed above, maximising Term (1) (the 10 GHz or other tone between 0 and 20 GHz) either minimises the DGD or else results in launch on the PSPs.

Consequently a control scheme is preferred which combines the minimisation of Term (2) with the maximization of Term (1) for a selected frequency (for example 10 GHz). In this way, the 20 GHz component is used to ensure that the system tries to fly at 45 degrees to the PSPs in conjunction with the 10 GHz component to minimise the total DGD in the system.

One example is to use as control parameter Term (1)–Term (2) and to apply control to maximise this parameter. In the 2×20 Gbit/s example, provided the total DGD does not exceed 25 ps, this provides a monotonic signal which moves in the optimal directions. Thus, for a given level of DGD it results in transmission at 45 degrees to the PSPs, and for a given launch state it minimizes the DGD.

A second example is to use as control parameter Term (1)/Term(2), and again to apply control to maximise this parameter.

These are two examples of control parameter, and there are of course an infinite number of parameters which can seek to minimise the 20 GHz tone and maximise the 10 GHz tone.

The above analysis assists in an understanding of the remaining components in FIG. 2. The output of the compensator fiber 22 is converted to an electrical signal using an opto-electric converter 26, which will typically comprise a photodiode device. This provides a broadband electrical signal. In order to measure the power at the frequencies of interest, first and second filters are provided 28,30. The first filter 28 provides the component of the electrical signal at the frequency of the two bit streams (20 GHz in the example given). The second filter 30 provides a different frequency, not a multiple of 20 GHz in this example. By way of example, the filter 30 may provide the 10 GHz component in this example.

Power measurement circuitry 32 obtains the electrical powers of these components, and defines a feedback loop for controlling the polarization controller 24. The circuitry provides a control signal 34 to the polarization controller 24. As discussed above, the control signal is selected such that the 20 GHz tone is minimized and the other tone is maximized. This is achieved by using a control signal 34 which maximises the ratio or the difference between the tones, as discussed above.

Figure 3:
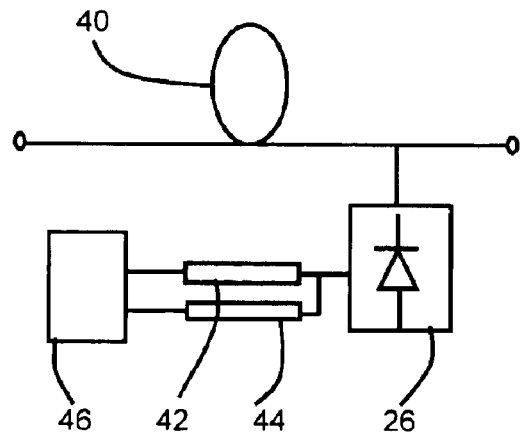
FIG. 3 shows one example of an apparatus for estimating PMD according to the invention.

FIG. 3 shows an apparatus for estimating PMD in an optical component 40 through which a bit interleaved optical signal has propagated. The optical component 40 may be any optical component, and may include many sections. For example, the component 40 may include the system fiber 20 and the compensator 22,24 of FIG. 2, so that the effect of the compensator control on the system PMD can be determined.

The output of the component 40 is converted to an electrical signal using an opto-electric converter 26, which will again typically comprise a photodiode device. A first filter 42 provides the do component of the electrical signal and a second filter 44 provides the component at the PBI bit frequency (40 GHz in the example given).

A processor 46 derives the PMD in the optical component 40 from the electrical signal powers at these frequencies.

The components of FIGS. 2 and 3 may be integrated into a single system, for both PMD compensation and measurement.

In the example above, the PSI is described as a 40 GHz signal made up from two 20 GBit/s bit streams. The invention is, however, applicable to any frequency of PBI signal.

Also, in the example above the PMD control is based on analysis of two tones. However, it is possible and within the scope of the invention to control PMD based solely on minimizing the 20 GHz tone.

The polarization controller may optically rotate the state of polarization of an input signal. However, it may instead physically rotate the input signal with respect to the birefringent element. For example, the birefringent element itself may be rotatable in order to control the launch angle into it. A rotatable birefringent element is intended to fall within the definition of a polarization controller, as this will control the relative orientation of the signal and the birefringent element.

Other variations will be apparent to those skilled in the art.

We claim:

1. A polarization mode dispersion (PMD) compensator for compensation of PMD in polarization bit interleaved (PBI) optical signals comprising two interleaved bit streams, the compensator comprising:
a polarization controller;
a birefringent element;
a converter for converting an optical output to an electrical signal; and
an analyser for analysing at least first and second spectral components of the electrical signal, the first having a frequency corresponding to the bit frequency of the two bit streams which form the bit interleaved signal and the second having a frequency not equal to an integer multiple of the bit frequency of the two bit streams which form the bit interleaved signal,
wherein the orientation of a signal entering the birefringent element is controlled by the polarization controller in dependence on the electrical signal power of one of the spectral components, having a frequency corresponding to the bit frequency of the two bit streams which form the bit interleaved signal.

2. A compensator as claimed in claim 1, wherein the orientation of the signal entering the birefringent element is controlled so as to minimize the power of the one spectral component.

3. A compensator as claimed in claim 1, wherein the analyser comprises a filter for extracting the one selected spectral component of the electrical signal.

4. A compensator as claimed in claim 1, wherein the orientation of the signal entering the birefringent element is controlled so as to maximize the ratio of the powers of the second and first spectral components.

5. A compensator as claimed in claim 1, wherein the orientation of the signal entering the birefringent element is controlled so as to maximize the difference between the second and first spectral components.

6. A compensator as claimed in claim 1, wherein the second spectral component has a frequency of approximately half the bit frequency of the two bit streams which form the bit interleaved signal.

7. A compensator as claimed in claim 1, wherein the bit frequency of the two bit streams which form the bit interleaved signal is 20 GHz.

8. A polarization mode dispersion (PMD) compensator for compensation of PMD in polarization bit interleaved (PBI) optical signals comprising two interleaved bit streams, the compensator comprising:
a polarization controller;
a birefringent element;
a converter for converting an optical output to an electrical signal; and
an analyser for analysing at least two selected spectral components of the electrical signal, wherein the orientation of a signal entering the birefringent element is controlled by the polarization controller in dependence on the electrical signal powers of the at least two spectral components, a first spectral component having a frequency corresponding to the bit frequency of the two bit streams which form the bit interleaved signal, and a second spectral component having a frequency not equal to an integer multiple of the bit frequency of the two bit streams which form the bit interleaved signal.

9. A compensator as claimed in claim 8, wherein the control of the orientation minimises the power of the first spectral component and maximises the power of the second spectral component.

10. A method of providing PMD compensation for compensation of PMD in polarization bit interleaved optical signals comprising two interleaved bit streams, the method comprising:
passing the signals through a birefringent element, and controlling the polarization at an input to the birefringent element;
converting the optical output from the birefringent element to an electrical signal;
measuring the electrical signal power at a first frequency corresponding to the bit frequency of each of the two bit streams which form the bit interleaved signal;
measuring the electrical signal power at a second frequency not equal to an integer multiple of the bit frequency of the two bit streams which form the bit interleaved signal; and
using the measured electrical signal powers as control parameters for controlling the polarization at the input to the birefringent element.

11. A method as claimed in claim 10, wherein the polarization is controlled so as to maximize the ratio of the powers at the second and first frequencies.

12. A method as claimed in claim 10, wherein the polarization is controlled so as to maximize the difference between the powers at the second and first frequencies.

13. A method as claimed in claim 10, wherein the second frequency is approximately half the bit frequency of the two bit streams which form the bit interleaved signal.

14. A method of providing PMD compensation for compensation of PMD in polarization bit interleaved optical signals comprising two interleaved bit streams, the method comprising:
passing the signals through a birefringent element, and controlling the polarization at an input to the birefringent element;
converting the optical output from the birefringent element to an electrical signal;
measuring the electrical signal powers at a first frequency corresponding to the bit frequency of each of the two bit streams which form the bit interleaved signal and at a second frequency not equal to an integer multiple of the bit frequency of the two bit streams which form the bit interleaved signal; and
using the measured electrical signal powers as control parameters for controlling the polarization at the input to the birefringent element.

15. A method as claimed in claim 14, wherein the control minimises the power at the first frequency and maximises the power of the second frequency.

* * * * *